UNITED STATES PATENT OFFICE.

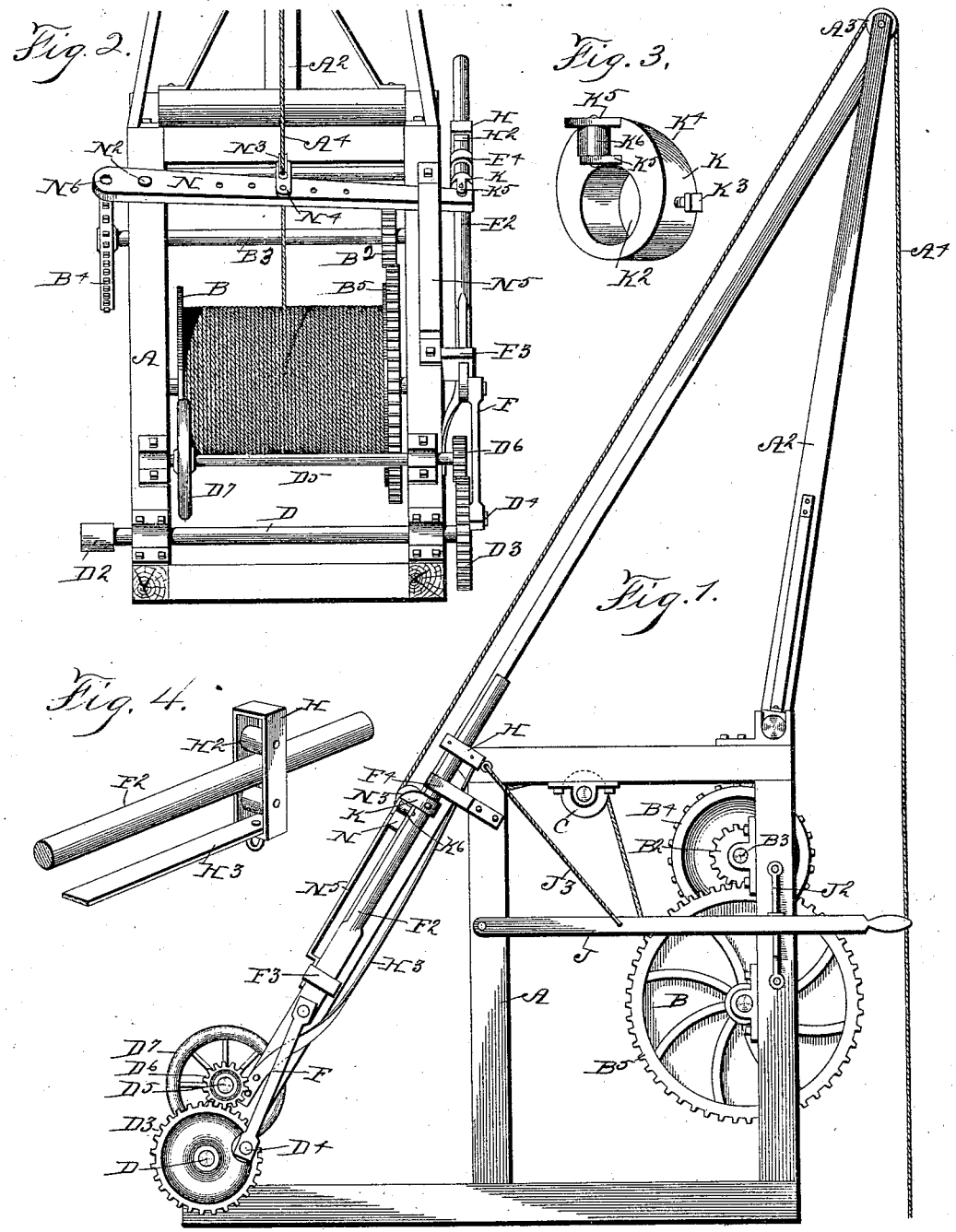

MARCELLUS D. FLANDERS, OF HAMILTON, IOWA.

WELL-DRILLING MACHINE.

SPECIFICATION forming part of Letters Patent No. 543,827, dated July 30, 1895.

Application filed January 24, 1895. Serial No. 536,000. (No model.)

*To all whom it may concern:*

Be it known that I, MARCELLUS D. FLANDERS, a citizen of the United States of America, residing at Hamilton, in the county of Marion and State of Iowa, have invented an Improved Well-Drilling Machine, of which the following is a specification.

The objects of this invention are to provide a simple, strong, and durable machine that may be operated with a minimum of applied power and that will automatically drop the well-drilling tools from their greatest point of elevation, and which may be quickly and easily adjusted to move the tools both upwardly and downwardly at the same speed.

My invention consists in certain details in the construction, arrangement, and combination of the various parts of the device, as hereinafter set forth, pointed out in the claims, and illustrated in the accompanying drawings, in which—

Figure 1 is a front view of the machine. Fig. 2 is a side elevation of the same. Fig. 3 is a detail perspective view of the trip device, and Fig. 4 is a perspective view of the upper end of the trip-bar and the device for guiding its movement.

Referring to the accompanying drawings, the reference-letter A is used to indicate the frame of the machine, and $A^2$ an upright pivoted to its top and having a pulley $A^3$ in its upper end adapted to support the tool-operating cable $A^4$.

B indicates the drum upon which the cable is wound. This drum is supported upon suitable bearings in the forward part of frame A and is adapted to be operated by a pinion $B^2$, fixed to a shaft $B^3$, on which is fixed a belt-wheel $B^4$, said pinion being in mesh with a cog-wheel $B^5$ fixed to the said drum. The cable is wound upon said drum, passed upwardly over a pulley, mounted in the machine-frame above the drum and then upwardly over the pulley $A^3$, and finally straight downwardly with the well-drilling tools attached to its end.

The mechanism for operating the tools comprise a shaft D, mounted in suitable bearings near the rear bottom portion of the machine-frame, having a belt-wheel $D^2$ on one end and a cog-wheel $D^3$ on the other, having a wrist-pin $D^4$ on its outer surface.

$D^5$ is a shaft mounted in suitable bearings above the shaft D and geared thereto by the pinion $D^6$ in mesh with the cog-wheel $D^3$, and provided with a fly-wheel $D^7$.

F indicates a pitman pivoted to the wrist-pin $D^4$, and $F^2$ is a trip-bar pivoted to the pitman and extended parallel with the sides of the frame A and supported at its lower end by the guide $F^3$ and at its upper end by means of a guide $F^4$, adapted to allow the bar a slight vertical movement.

H is a frame having two rollers $H^2$ therein adapted to admit the upper end of said trip-bar between them. This frame is normally pressed upwardly by means of the leaf-spring $H^3$, fixed thereto and to a part of the machine-frame, and its end projecting beyond the front of the frame and held downwardly by a rack $J^2$ and connected with said frame H by the rope $J^3$. It will be obvious that a downward pull upon the lever J will bring the frame H and the upper end of the trip-bar downwardly, and vice versa.

K indicates the trip device, having an opening $K^2$ adapting it to be placed on the upper end of the trip-bar and be held in place by the set-screw $K^3$. Its upper edge is rounded at $K^4$ for purposes hereinafter explained, and on its under surface two lugs $K^5$ are formed to admit a roller $K^6$ between them, the outer lug being preferably extended some distance beyond the edge of the roller.

N indicates a lever pivoted near its one end to the top of the frame A by means of the detachable pin $N^2$, and having a pulley $N^3$ mounted in a suitable frame $N^4$ that is adjustably connected with its central portion and under which pulley the cable $A^4$ is passed. The other end of said lever passes under a guard $N^5$ on the opposite side of the machine-frame, with its end in position to be engaged by the trip device K, and of such a length that the trip device will pass beyond its end when drawn downwardly to the full limit of its stroke.

$N^6$ indicates an opening formed in the end of said lever beyond its pivoted point, that when the lever is pivoted by extending the pin through the said opening its other end will not pass beyond the trip device when at the limit of its stroke.

In practical operation the cable is wound upon the drum B, passed over the pulley C, under the pulley N³, and finally over the pulley at the top of the frame. When the shaft D is rotated the trip-rod is drawn downwardly, the trip device will engage the end of the lever N, and the lug K⁵ overlap said end and hold the lever to the roller K⁶. Then as the trip-rod is moved downwardly the roller will gradually approach the end of the lever and the well-tools on the cable be elevated. Before reaching the downward limit of its stroke the trip device will pass beyond the end of the lever and the well-tools will drop and the lever be elevated. As the trip-rod again moves upwardly the rounded edge of the trip device will engage the end of the lever and press the trip-rod downwardly to pass under the lever, and by means of the spring H³ be pressed upwardly to engage the lever on its next downward movement. When it is desired to quickly stop the operation of the machine the lever J is pressed downwardly and the trip-bar held out of engagement with the lever N, and if it is desired to operate the well-tools with equal speed on their upward and downward movements the lever N is pivoted in the outer opening.

Having thus described my invention, what I claim as new therein, and desire to secure by Letters Patent of the United States therefor, is—

1. In a well drilling apparatus the combination with a suitable frame having a drum thereon, a pulley fixed to an inclined stationary support, a cable wound upon said drum and passed over said elevated pulley, and well drilling tools on its ends, of a lever pivoted at one end to the machine frame, a pulley attached to its central portion and having said cable passed thereunder, a bar mounted in suitable bearings in the side of the machine frame at right angles to said lever and adapted to move longitudinally, a trip device thereon adapted to engage the free end of said lever and draw the lever downwardly until the end of the lever passes inwardly beyond the said trip device, and means for reciprocating said bar, for the purposes stated.

2. In a well drilling apparatus, the combination with a suitable frame having a drum thereon, a pulley fixed to an elevated stationary support and a cable wound upon said drum and passed over the elevated pulley and well drilling tools on its end, of a lever pivoted on an inclined part of the frame, a pulley attached to its central portion and having said cable passed thereunder, a trip bar slidingly mounted in the frame at approximately right angles to the lever and having its upper end capable of a movement downwardly from the said lever a yielding pressure device for holding the end of said bar upward, a trip device on said bar to engage the end of said lever and means for reciprocating said trip bar, for the purposes stated.

3. An improved well drilling machine, comprising a suitable frame, a drum mounted therein, means for operating the drum, a cable wound upon said drum, a pulley in the frame near the drum and a pulley at the top of the frame, a lever pivoted at one end of the frame, a pulley attached to said lever and having said cable passed thereunder, a trip bar slidingly mounted at the side of the frame with its upper end capable of swinging downwardly, a frame adapted to admit the upper end of said trip bar to slide therein, a yielding pressure device for holding the said frame upwardly, a lever connected therewith for drawing the frame downwardly, the trip device on said trip having a roller on its under side and a lug projecting beyond the roller for the purposes stated, a shaft adapted to be driven by suitable power and having a crank wheel thereon, a pitman pivoted to the crank wheel and to said trip bar and a shaft geared to the said power shaft and a fly wheel fixed thereto, substantially as and for the purposes stated.

MARCELLUS D. FLANDERS.

Witnesses:
J. T. MITCHELL,
I. L. MUNSELL.